(12) United States Patent
Yoshida

(10) Patent No.: US 7,404,776 B2
(45) Date of Patent: Jul. 29, 2008

(54) HYDRAULIC TENSIONER

(75) Inventor: Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 451 days.

(21) Appl. No.: 11/032,584

(22) Filed: Jan. 10, 2005

(65) Prior Publication Data

US 2005/0265856 A1    Dec. 1, 2005

(30) Foreign Application Priority Data

May 31, 2004    (JP)    ............... 2004-161528

(51) Int. Cl.
*F16H 7/08*    (2006.01)
(52) U.S. Cl. .................................... 474/110
(58) Field of Classification Search ............... 474/101, 474/109, 110; 137/533.11, 533.15, 538, 137/539
See application file for complete search history.

(56) References Cited

U.S. PATENT DOCUMENTS

| | | | |
|---|---|---|---|
| 5,346,436 A * | 9/1994 | Hunter et al. ............. | 474/110 |
| 5,643,117 A * | 7/1997 | Dembosky ................. | 474/110 |
| 5,971,015 A * | 10/1999 | Gonsior .................... | 137/533.11 |
| 6,811,505 B2 * | 11/2004 | Hashimoto et al. ........ | 474/110 |
| 7,174,799 B2 * | 2/2007 | Yoshida et al. ............ | 474/110 |
| 7,244,204 B2 * | 7/2007 | Yoshida et al. ............ | 474/110 |
| 2004/0266572 A1 * | 12/2004 | Yoshida et al. ............ | 474/110 |
| 2005/0096166 A1 * | 5/2005 | Wakabayashi et al. .... | 474/110 |
| 2005/0227799 A1 * | 10/2005 | Yoshida .................... | 474/110 |
| 2006/0094549 A1 * | 5/2006 | Yoshida et al. ............ | 474/110 |

FOREIGN PATENT DOCUMENTS

| | | | |
|---|---|---|---|
| DE | 3112932 A1 * | 12/1982 |
| JP | 59-110459 | 7/1984 |
| JP | 61-218856 | 9/1986 |
| JP | 03-239845 | 10/1991 |
| JP | 6-65655 | 9/1994 |
| JP | 07-012187 | 1/1995 |
| JP | 08 247311 | 9/1996 |
| JP | 2002-206603 | 7/2002 |
| JP | 2003-156108 | 5/2003 |
| JP | 2003-247616 | 9/2003 |

OTHER PUBLICATIONS

Osamu Yoshida, inventor; patent application Hydraulic Tensioner; U.S. Appl. No. 11/039,661, filed Jan. 19, 2005.

* cited by examiner

*Primary Examiner*—Vicky A Johnson
(74) *Attorney, Agent, or Firm*—Howson & Howson LLP

(57) ABSTRACT

A check valve unit in a hydraulic tensioner comprises a check ball which controls the flow of the oil to and from a high pressure oil chamber formed by a plunger and the plunger-receiving hole of the tensioner housing, a ball guide in which the check ball moves, a retainer which seals the check ball in the ball guide, and a ball seat which blocks reverse flow of oil by seating the check ball. Grooves, which ventilate air from the high pressure oil chamber to an oil supply passage, are formed on an outer circumferential surface of the ball guide and a bottom surface of the ball seat.

1 Claim, 7 Drawing Sheets

HYDRAULIC TENSIONER

FIELD OF THE INVENTION

This invention relates to a hydraulic tensioner for maintaining proper tension in a traveling, flexible power transmission medium such as a timing chain, a timing belt, or the like, in a vehicle engine.

BACKGROUND OF THE INVENTION

Hydraulic tensioners which include a check valve mechanism been widely used to maintain proper tension in timing chains and timing belts which transmit rotation from a crankshaft to one or more camshafts in a vehicle engine. The check valve mechanism is used to prevent vibration generated during the operation of the chain or belt.

A conventional hydraulic tensioner typically includes a check valve mechanism comprises a metal cylinder fitted into a cylindrical plunger-receiving hole formed in a housing, a plunger slidably received in the hole and having an end portion protruding from the housing and biased in the protruding direction by a spring inside the housing, and a high pressure oil chamber formed between the inside of the plunger and the plunger-receiving hole in the housing. The check valve mechanism may be assembled prior to installation in the tensioner housing, and comprises cylindrical block, a ball seat having an oil passage, a check ball, a coil spring and a lid. Such a check valve mechanism is shown in Japanese Laid-Open Patent Publication No. 2002-206603 (Page 1, FIG. 1).

The above-described check valve mechanism requires high accuracy machining, and consequently its production cost was high, and difficulties were encountered in the assembly of the tensioner.

A related hydraulic tensioner, invented by the inventor of the present invention, is shown in FIGS. 6 and 7. In the tensioner 500, a plunger 520 fits slidably in a plunger-receiving hole of a housing 510, and is biased in the protruding direction by a coil spring 530 situated in a high pressure oil chamber R formed by the plunger and the housing. The tensioner includes a check valve unit 540, which controls the flow of oil into and out of the high pressure oil chamber. The check valve unit comprises a check ball 541, a ball guide 542 in which the check ball 541 moves, a disc-shaped retainer 543, which seals the check ball 541 in the ball guide 542, and a ball seat 544, which blocks reverse flow of oil by seating the check ball 541.

When the hydraulic tensioner 500 is arranged to apply tension to a chain on an engine in such a manner that its plunger 520 protrudes downward to abut the chain, air accumulated in the high pressure chamber R is not adequately ventilated. Consequently, the force exerted by the plunger on the chain is sometimes insufficient. In such a case, backlash noises are generated by the chain.

Objects of this invention are to solve the above-mentioned problems, and to provide a hydraulic tensioner in which, even when the plunger protrudes downward, adequate air ventilation from the high pressure chamber of the tensioner is provided so that backlash noises are suppressed and leak down of oil from the high pressure oil chamber can be controlled. It is also an object of the invention to provide a hydraulic tensioner that has the above advantages, but can be produced easily.

SUMMARY OF THE INVENTION

The hydraulic tensioner according to the invention comprises a tensioner housing having a plunger-accommodating hole. The plunger-accommodating hole has a cylindrical inner wall, an opening at one end, and a bottom at an end opposite from the opening. A plunger, which is slidable in the plunger-accommodating hole and protrudes therefrom, is adapted to maintain tension in a flexible, traveling power transmission medium such as a chain or belt. The plunger and housing together cooperate to define a high pressure oil chamber which receives oil under pressure from an oil supply passage formed at the bottom of the plunger-accommodating hole. A plunger biasing spring, accommodated in the high pressure oil chamber, urges the plunger in a protruding direction. A check valve unit is also disposed within the plunger-accommodating hole, adjacent the oil supply passage, for allowing oil to flow into the high pressure oil chamber from the oil supply passage but blocking reverse flow of oil from the high pressure oil chamber. The check valve unit comprises a check ball, a ball seat having an end surface facing the bottom of the plunger-accommodating hole, a ball guide including an inner wall surrounding the check ball with a clearance, an outer circumferential surface fitting the cylindrical wall of the plunger-accommodating hole, and a disc-shaped retainer sealing the check ball in the ball guide. The check ball is movable in the ball guide toward and away from the ball seat, to allow oil to flow through the ball seat of the check valve unit into the high pressure oil chamber but to block reverse flow of oil out of the high pressure oil chamber by seating of the check ball against the ball seat. Ventilating grooves are formed on the outer circumferential surface of the ball guide and on the end surface of said ball seat. These ventilating grooves are in communication with one another, and providing a path for the flow of air from the high pressure oil chamber to the oil supply passage. In a preferred embodiment of the hydraulic tensioner, the ball guide is composed of a synthetic resin.

By virtue of the check valve unit, the hydraulic tensioner can apply proper tension to a timing chain, a timing belt or the like in a vehicle engine. However, the grooves provided on the outer circumferential surface of the ball guide the end surface of the ball seat additionally provide for ventilation of air from the high pressure oil chamber of the tensioner, so that, even if the tensioner is attached in an engine block in such a way that the plunger protrudes downward, air is easily ventilated from the high pressure chamber, and consequently adequate force can be exerted consistently against the chain, backlash noises can be suppressed, and leak down of oil from the high pressure chamber can be easily controlled.

Where the ball guide is composed of a synthetic resin, ventilating grooves can be easily formed on the outer circumferential surface of the ball guide, thereby making it unnecessary to carry out additional machining of the metal housing or of the ball guide.

DETAILED DESCRIPTION OF THE PREFERRED EMBODIMENTS

The invention is applicable to various forms of hydraulic tensioners including hydraulic tensioner having a rack formed on plunger for cooperation with a ratchet pawl pivoted on a housing.

Figure 1:
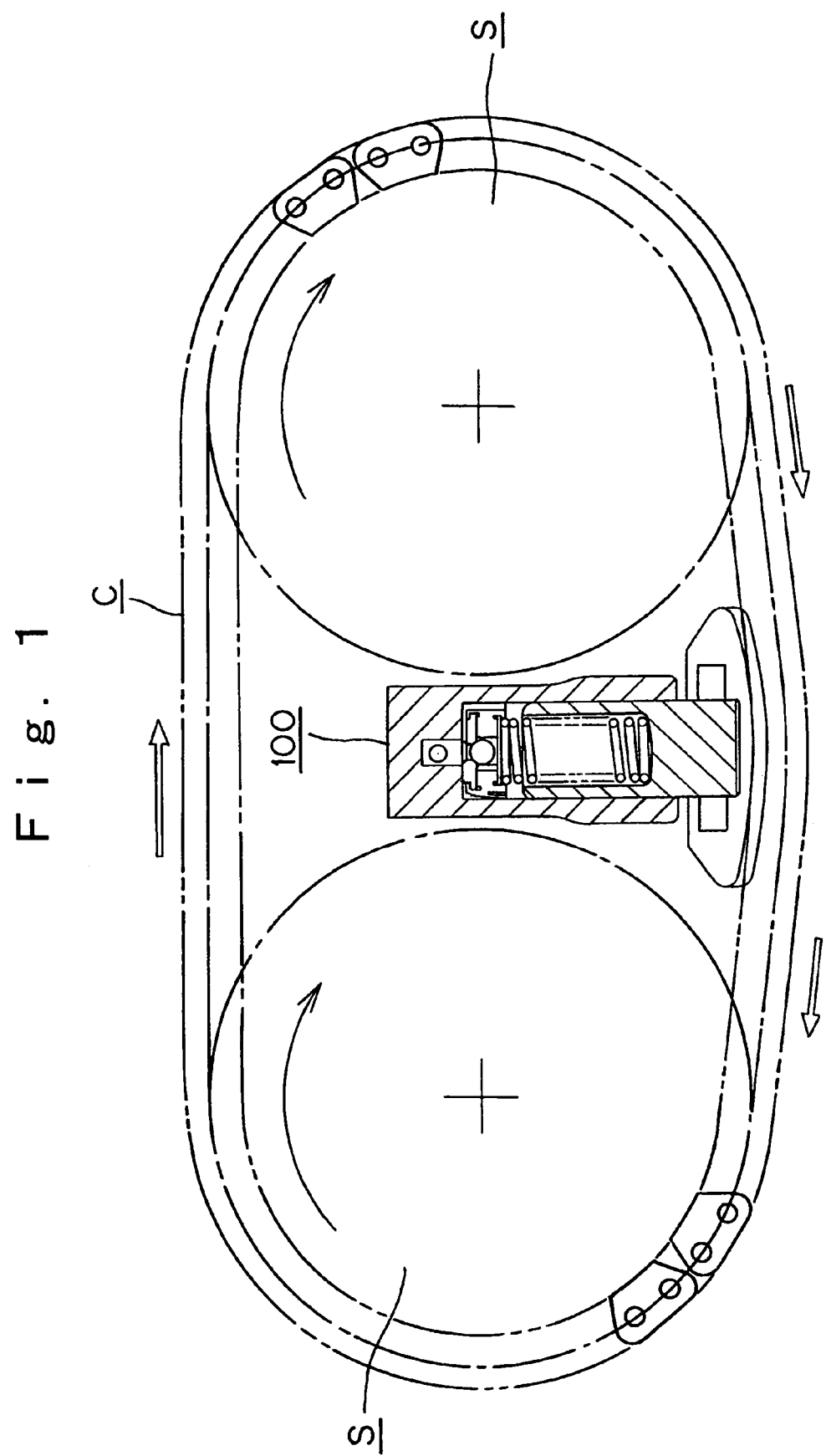
FIG. 1 is a schematic elevational view showing a hydraulic tensioner according to the invention in use in a chain transmission.
Figure 2:
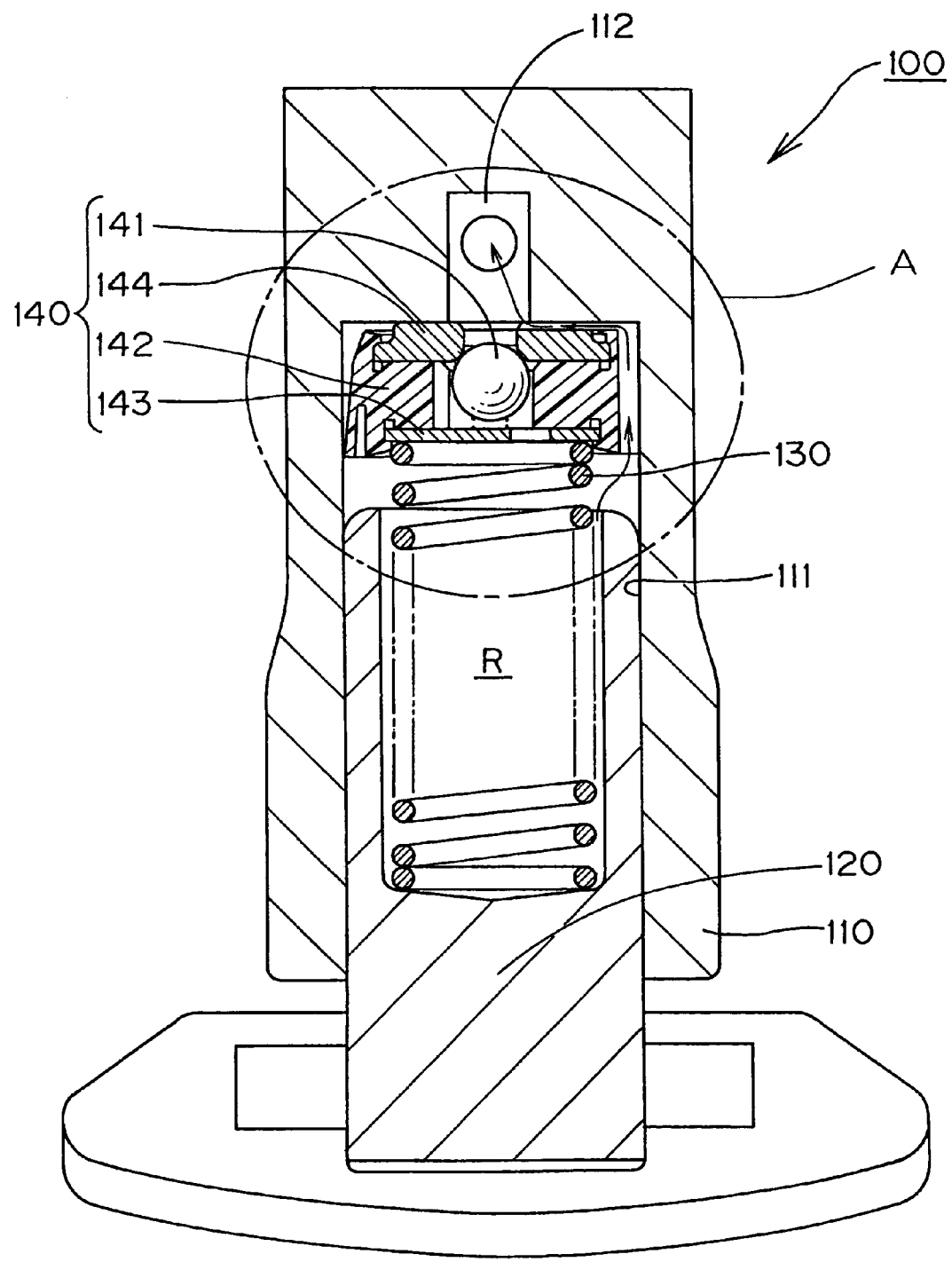
FIG. 2 is a cross-sectional view of the hydraulic tensioner shown in FIG. 1.

As shown in FIGS. 1 and 2, a hydraulic tensioner 100, is disposed between a pair of cam sprockets S in such a manner that its plunger protrudes downward from a front surface of its housing in order to maintain tension in a chain C, meshing with the two cam sprockets.

In the hydraulic tensioner 100, as shown in FIG. 2, the plunger 120, which is outwardly cylindrical, fits slidably in a plunger-accommodating hole 111 formed in a tensioner housing 110. A high pressure oil chamber R is formed between the plunger 120 and the plunger-accommodating hole 111. This chamber accommodates a plunger-biasing coil spring 130, which urges the plunger 120 in a protruding direction.

Figure 3:
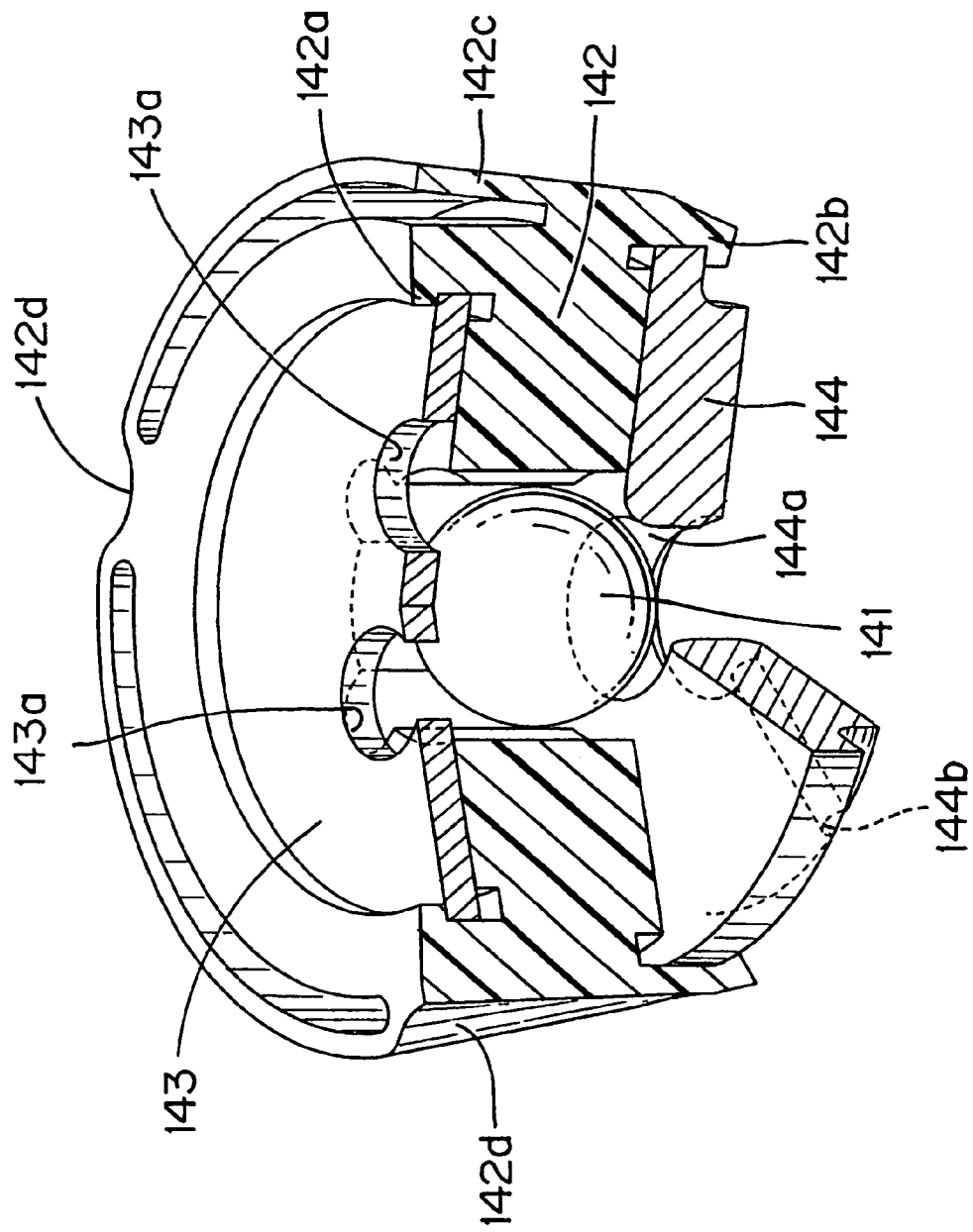
FIG. 3 is an enlarged, partly broken-away, perspective view of the check valve unit of the tensioner shown in FIG. 2.
Figure 4:
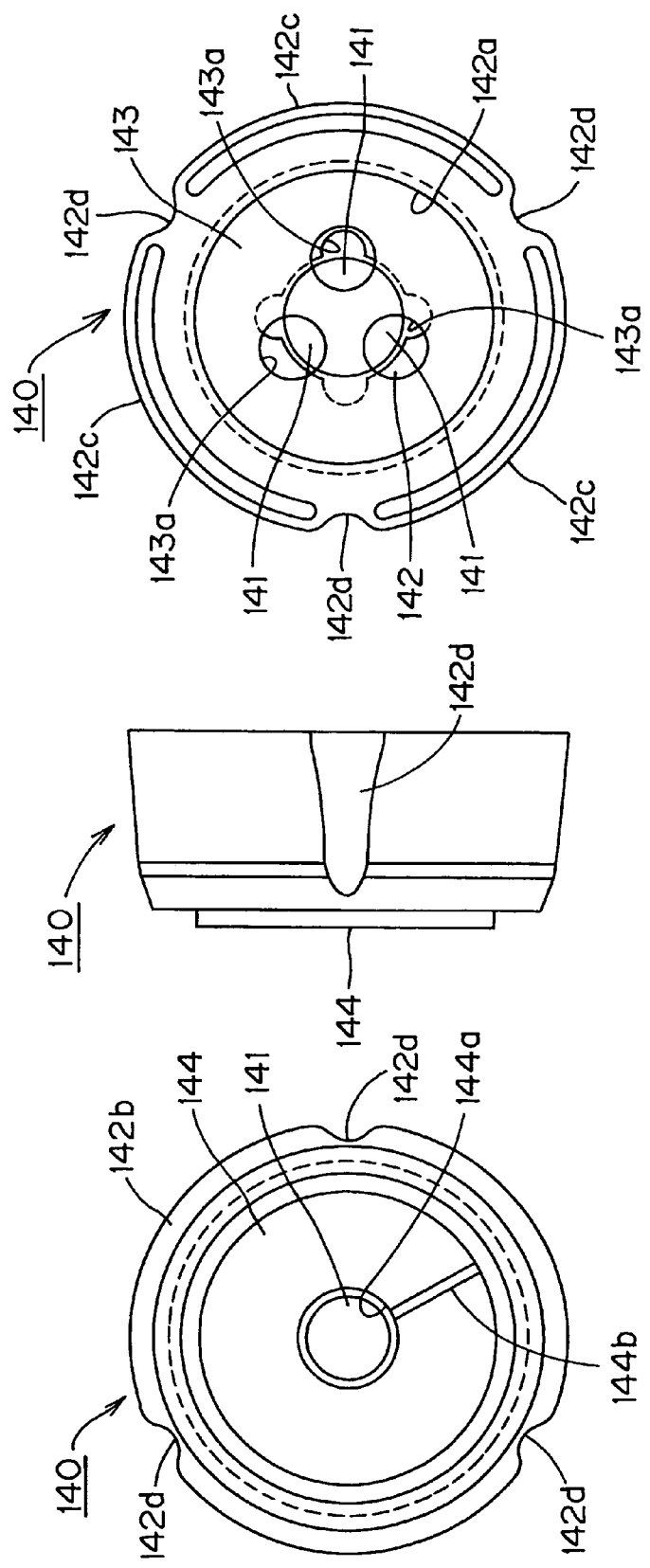
FIGS. 4(A), 4(B) and 4(C) are respectively a top view, a side view, and a bottom view of the check valve unit.
Figure 5:
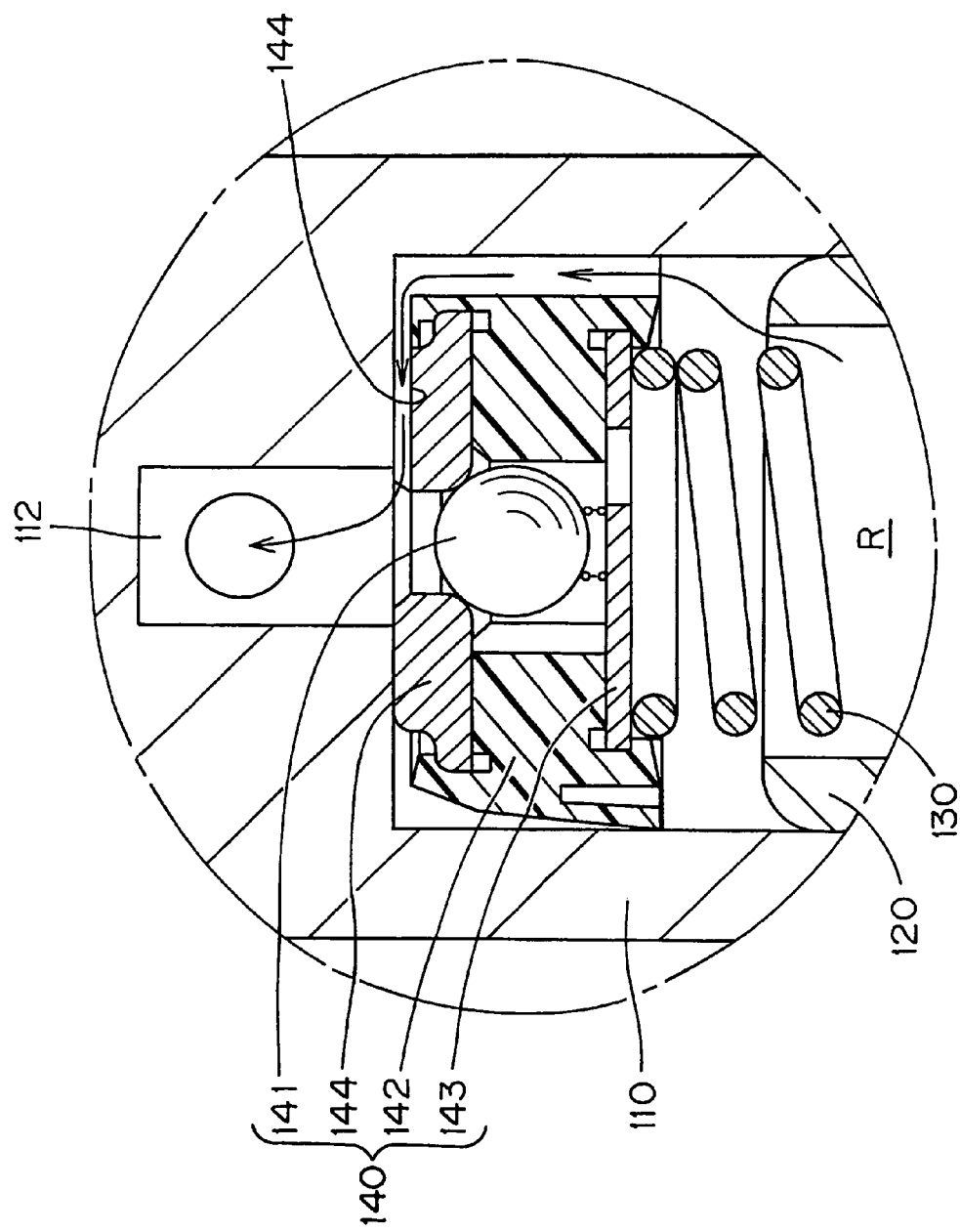
FIG. 5 is an enlarged sectional view illustrating air-ventilation of the high pressure chamber in the portion, designated by the letter "A" of the tensioner of FIG. 2.
Figure 6:
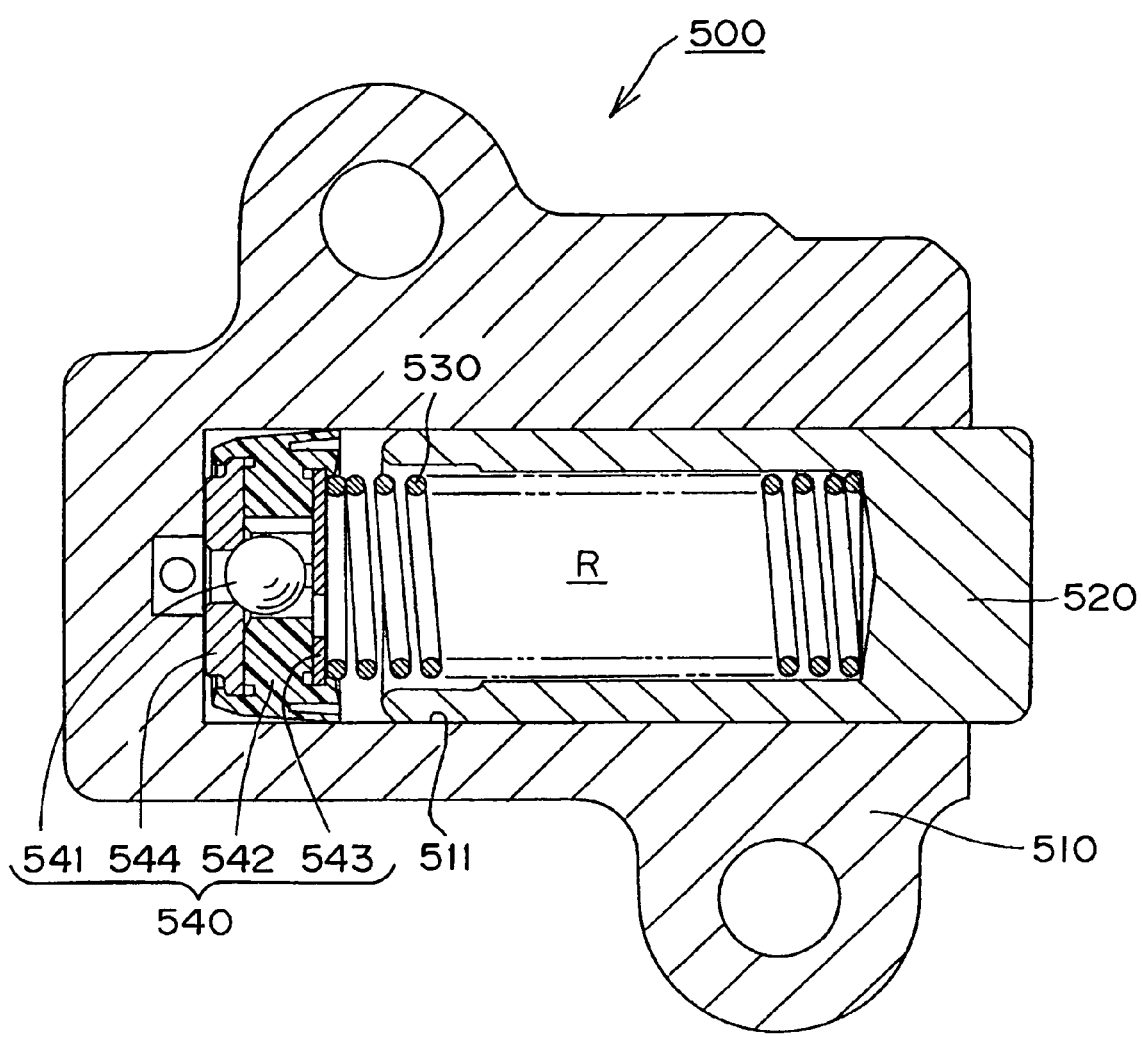
FIG. 6 is a cross-sectional view of a related hydraulic tensioner.
Figure 7:
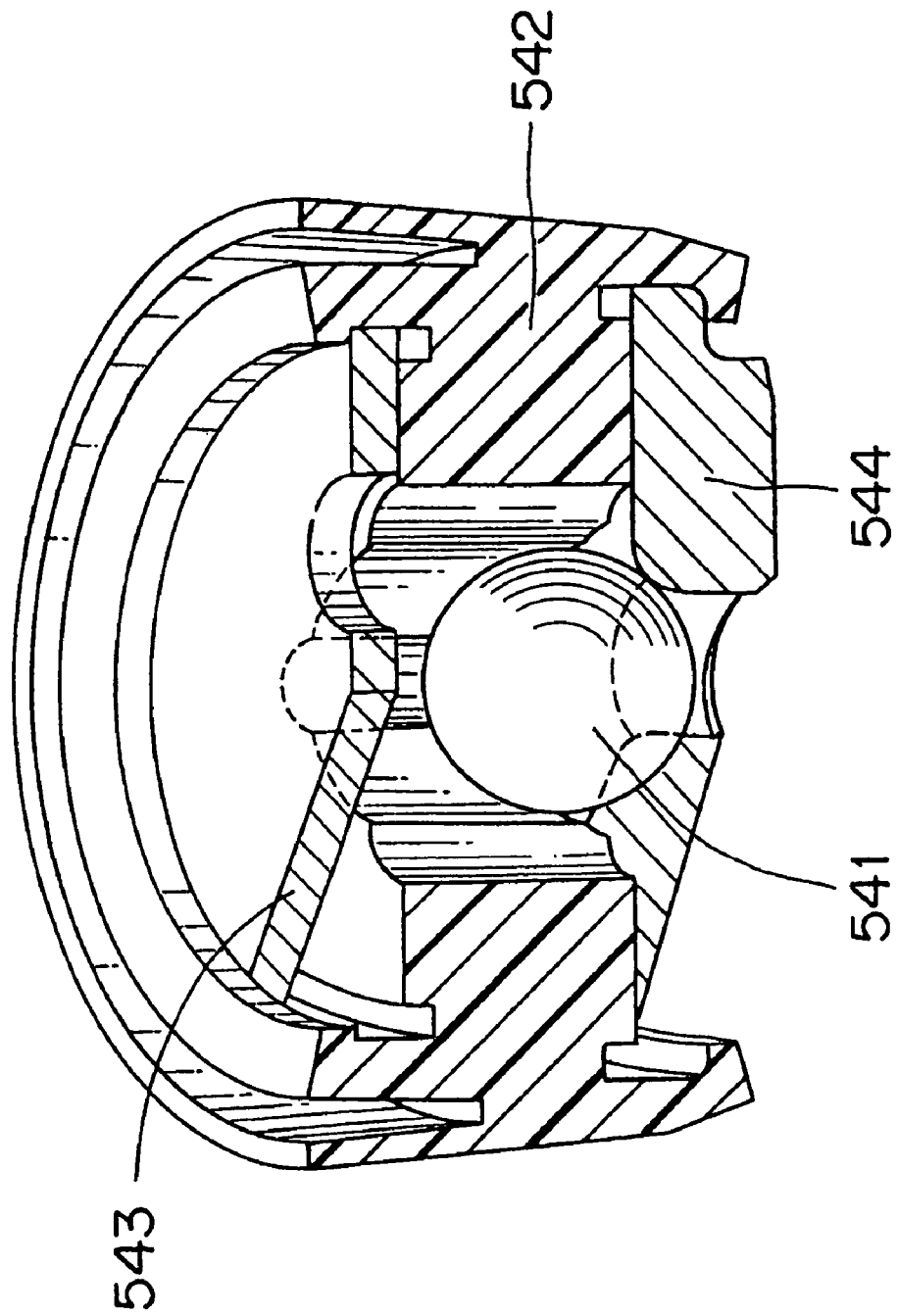
FIG. 7 is a partly broken-away, enlarged perspective view of the check valve unit of the tensioner shown in FIG. 6.

A check valve unit 140 is provided adjacent the bottom of the plunger accommodating hole 111, i.e., the end of the hole opposite from the opening through which the plunger protrudes. The check valve unit blocks the reverse flow of oil which enters the high pressure oil chamber R under pressure through an oil supply passage 112. The check valve unit 140 comprises a check ball 141, which controls the flow of oil, a ball guide 142, in which the check ball 141 moves with a clearance, a disc-shaped retainer 143, which seals the check ball 141 in the ball guide 142, and a ball seat 144, on which the check ball seats to block reverse flow of oil from the high pressure oil chamber R. As shown in FIGS. 3 and 4, an oil communicating hole 144*a* is provided in the ball seat 144. The check ball 141 may be composed of any suitable material, such as metal, ceramic or synthetic resin, and has a diameter such that it is movable within the ball guide 142, which is preferably composed of synthetic resin.

Since the ball guide 142 is typically used in the high temperature environment of an internal combustion engine, a polyamide resin such as nylon 46, nylon 66, glass fiber reinforced nylon or the like, all of which exhibit excellent heat resistance, is preferably used. As shown in FIG. 3, the ball guide 142 includes a seal 142*a*, disposed in a circle on the high pressure oil chamber side of the check valve unit to secure the retainer 143 to the ball guide. A circular seal 142*b* disposed on the inflow side of the ball guide is used to secure the ball seat to the ball guide. A circumferential tongue 142*c*, formed on the ball guide is provided so that the ball guide can be press-fit into the bottom portion of the plunger-accommodating hole 111. The tongue presses against the cylindrical wall of the plunger-accommodating hole 111 of the housing, providing a seal.

Since for reliable positioning of the plunger-biasing spring 130, the disk-shaped retainer 143 is abutted by one end of spring 130, as shown in FIG. 2, the retainer is preferably made of metal. As shown in FIGS. 3 and 4 oil communicating holes 143*a* are bored in the retainer 143.

Since the retainer 143 is secured to the ball guide by circular seal 142*a*, and the ball seat 144 is also secured to the ball guide by a circular seal on the inflow side of the ball guide 142, the check valve unit 140 can be handled without risk that its components will separate from one another. Accordingly, during assembly of the tensioner, when the check valve unit 140 is inserted into the plunger accommodating hole 111, the ball seat 144 and retainer 143 will not drop away from the ball guide.

V-shaped air-inducing grooves 142*d* and 144*b*, which ventilate air from the high pressure oil chamber R to the oil supply passage, are respectively formed on the outer circumferential surface of the ball guide 142 and the end surface of the ball seat 144 which faces the end of the plunger-accommodating hole in the assembled tensioner. Groove 144*b* communicates with grooves 142*d* to provide an air flow path leading from the high pressure oil chamber R to the oil supply passage 112. Accordingly, as compared with the above-mentioned related hydraulic tensioner, even if the tensioner is attached to an engine block in such a manner that the plunger 120 protrudes downward, air-ventilation from the high pressure chamber R is provided so a sufficient tensioning force is consistently exerted by the plunger 120 against the chain C, backlash noise is suppressed, and oil leak down in the high pressure chamber R is controlled.

In the hydraulic tensioner 100 in accordance with the invention, the high pressure oil chamber R is always filled with oil supplied from the outside through the check valve unit 140 by an oil pump or the like. When the traveling timing chain C loosens, the plunger 120, which is continuously biased by spring 130, moves in the protruding direction, and the check valve 140 opens so that oil flows into the high pressure oil chamber R.

When the plunger 120 is pressed into the plunger-accommodating hole 111 as a result of an impact force imparted by the timing chain C against the biasing force of spring 130, the pressure of the oil in chamber R is increased and the check ball 141 is pushed against the ball seat 144. Consequently, the check valve blocks reverse flow of oil from the high pressure oil chamber R to the oil supply passage 144*a* in the ball seat 144. As a result, the oil pressure in chamber R is further increased, and oil leaks through the V-shaped air-inducing grooves 142*d* and 144*b*, and is discharged through the oil supply passage 112 in the housing 110. The viscous flow of oil though these grooves damps vibrations resulting from impact force acting on the plunger 120, and consequently, any vibration of the plunger 120 due to impact is quickly eliminated.

As described above, in the hydraulic tensioner 100, air-inducing grooves 142*d* and 144*b*, which ventilate air from the high pressure oil chamber R to the oil supply passage 112, are respectively formed on an outer circumference of the ball guide 142 and the surface of the ball seat 144 which faces the end of the plunger-accommodating hole in the housing. These grooves communicate with one another, and, accordingly, even if the tensioner is attached to an engine block in such a manner that its plunger 120 protrudes downward, air is readily ventilated from the high pressure chamber R, and a sufficient tensioning force can be exerted continuously by the plunger 120 on the chain C. Thus, backlash noise produced by the chain C can be suppressed, and leak down of oil from the high pressure chamber R can be easily controlled. Furthermore, when the ball guide 144 is composed of a synthetic resin, the air-inducing grooves 142*d* can be easily formed on its outer circumferential surface in the process of molding the ball guide 142, and it is unnecessary to subject the plunger-accommodating hole 111 in the metal housing 110 to additional machining steps. Thus, the tensioner in accordance with the invention has significant advantages over conventional hydraulic tensioners.

Although, in the preferred embodiment shown, the ball guide has three grooves 142*d*, with a uniform circumferential spacing, and the ball seat has a single radial groove 144*b*, different numbers and arrangements of the grooves can be used. Moreover, various other modifications can be made to the tensioner and to its check valve unit without departing from the scope of the invention as defined in the claims.

I claim:

1. A hydraulic tensioner comprising:

a tensioner housing having a plunger-accommodating hole, said hole having a cylindrical inner wall, an opening at one end and a bottom at an end opposite from said opening;

a plunger slidable in said plunger-accommodating hole and protruding therefrom, said plunger being adapted to maintain tension in a flexible, traveling power transmission medium, said plunger and said housing together cooperating to define a high pressure oil chamber;

an oil supply passage formed in the bottom of said plunger-accommodating hole;

a plunger biasing spring, accommodated in said high pressure oil chamber, the plunger biasing spring urging the plunger in a protruding direction; and a check valve unit, disposed within said plunger-accommodating hole adjacent said oil supply passage, for allowing oil to flow into said high pressure oil chamber from said oil supply passage but blocking reverse flow of oil from said high pressure oil chamber;

wherein said check valve unit comprises a check ball, a ball seat having an end surface facing said bottom of the plunger-accommodating hole, a ball guide including an inner wall surrounding the check ball with a clearance and an outer circumferential surface fitting said cylindrical wall of the plunger-accommodating hole, and a disc-shaped retainer sealing the check ball in the ball guide;

wherein the check ball is movable in the ball guide toward and away from the ball seat, to allow oil to flow through the ball seat of the check valve unit into the high pressure oil chamber but to block reverse flow of oil out of the high pressure oil chamber by seating of the check ball against the ball seat;

wherein ventilating grooves are formed on said outer circumferential surface of the ball guide and on said end surface of said ball seat, the ventilating grooves being in communication with one another and providing a path for the flow of air from said high pressure oil chamber to said oil supply passage;

wherein the ball guide of the check valve unit is composed of a synthetic resin, and includes a circumferential tongue pressing against the inner wall of the plunger-accommodating hole, whereby the ball guide is press-fit in the plunger-accommodating hole adjacent the bottom of the plunger-accommodating hole, and wherein the circumferential tongue is interrupted by at least one ventilating groove formed on the outer circumferential surface of the ball guide; and wherein the ball guide has an inner portion defining said inner wall surrounding the check ball, and in which at least one arcuate slot is provided between said inner portion and the circumferential tongue, the arcuate slot allowing flexing of the tongue to press against the inner wall of the plunger-accommodating hole, and in which the tongue is connected to the inner portion of the ball guide at both ends of each said arcuate slot by a connecting element and in which each said ventilating groove formed on the outer circumferential surface of the ball guide is formed in one said connecting element.

* * * * *